Jan. 23, 1951     A. DREYER     2,539,237
METHOD OF MAKING INTERLEAVED TUBES
Filed Jan. 24, 1946
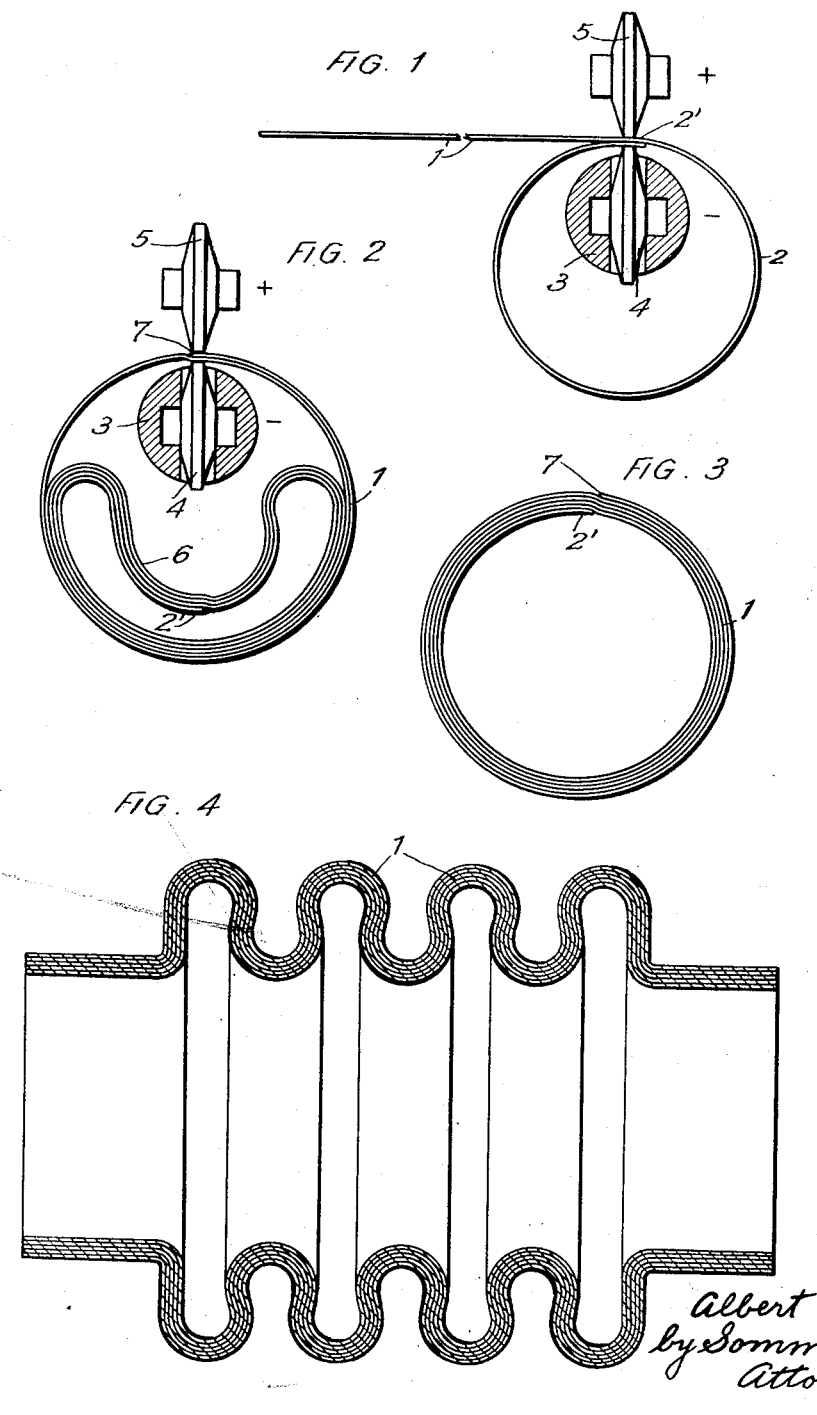
Inventor:
Albert Dreyer
by Sommers Young
Attorneys Patented Jan. 23, 1951

2,539,237

UNITED STATES PATENT OFFICE 2,539,237

METHOD OF MAKING INTERLEAVED TUBES

Albert Dreyer, Lucerne, Switzerland, assignor to Metallschlauchfabrik A. G., Lucerne, Switzerland Application January 24, 1946, Serial No. 643,129
In Switzerland February 2, 1945

1 Claim. (Cl. 113—33)

This invention relates to a method of making manifoldly interleaved resilient tubular bodies, that is, bellows-like bodies, which have hitherto generally been made from thin-walled, seamless tubes. Resilient bodies of this kind are also known which have been made from gas-fusion welded or electrically welded or soldered tubes.

For higher pressures, instead of thick-walled tubes, resilient tubular bodies are made, which consist of several interfitting, seamless or gas-fusion welded, thin-walled tubes, for the reason that such a manifoldly interleaved resilient tubular body of equal total wall thickness has far greater elasticity and flexibility compared with a single-walled resilient body.

However, up to the present, resilient tubular bodies with fourfold interleaved walls at the most have been available on the market, and these can be used for relatively low pressures only. Although the bursting pressure of a manifoldly interleaved resilient body of this kind has a value which is many times greater than that of the allowable pressure, at high pressures, however, lasting deformations of the waves ensue relatively soon, in which way, on one hand, the elasticity is considerably decreased and, on the other hand, the life of the resilient body is materially decreased.

By way of example, although a short resilient tombac tube, having a clear diameter of 100 mm. and a fourfold interleaved wall of a total thickness of 0.8 mm., by being composed of four individual tubes of 0.2 mm. wall thickness, presents a value of bursting pressure of over 150 atm. overpressure, already at a pressure of 30 atm. overpressure lasting deformation ensues, so that the depression between crests becomes narrower and the wave crest widens so that a loss of elasticity which amounts to 30 to 40% or more, dependent upon the hardness of the material, ensues.

As the material for the resilient tubular body, hitherto, most of the time tombac was used. Non-rusting steel enters into question only for welded tubes, for the reason that tubes of such wall thinnesses, as required for the manufacture of resilient tubular bodies are, up to the present, not available in seamless non-rusting steel quality. Again, the welding can be effected only by electrical resistance welding with seam-overlap, since butt welding of tubes of such thinness of wall is, up to the present, not practicable.

However, in consequence of the electrical resistance welding, that is the overlap along the seam, a tube portion of a double wall thickness is formed which results, particularly if several tubes are interfitted with each other, in an undesirable stiffening of the resilient body. Experience has shown that it is impossible to reduce the thickness of material at the overlapping seam by squeezing the seam during the resistance welding so as approximately to even out the seam in conformity with the remainder of the wall of the resilient body. Although such squeezing of the seam is feasible, seams of this kind have proved not to be vacuum-tight so as to become out of the question as far as the manufacture of resilient tubular bodies is concerned, not to speak of the fact that such squeezing of the seam is possible only by overheating the working material, in consequence whereof, the strength as well as the resistivity to corrosion of the material is impaired.

The working of a manifoldly interleaved tube into a resilient body is successful only when the individual tubes are superimposed on each other perfectly compactly, as otherwise detrimental folding of the material ensues. If tubes of relatively long lengths are superimposed on each other, the tubes must be coated with oil or grease, for the purpose of minimizing the clearance between the individual tubes and avoiding friction which would set up in sliding the tubes into each other in dry state. The layers of oil or grease being retained between the individual tube walls have, however, a detrimental effect, for the reason that in fastening pipe fittings to the tube by welding, soft-soldering or hard-soldering, the lubricant evaporates and thus hampers or even frustrates the reliable sealing by the formation of continually released bubbles. If the resilient tube is subjected to high temperatures the evaporation of the lubricant remnants between the individual tubes may cause substantial deformation of the wavily corrugated tube portions, due to the gases being prevented from being released.

By thickening the wall at the seam overlap, further, the working of the tube into a resilient body, either by subjecting it to rolling or to the action of hydraulically operated tools, is hampered and the tools are detrimentally affected.

The demand on resilient tubular bodies of a high elasticity and capability of yielding, for high pressures, increases more and more, particularly for the construction of pressure regulators. However, the problem involved cannot be solved by employing correspondingly thick-walled resilient tubular bodies, for the reason that the stiffness of the tubular body thus becomes too great and its capability of yielding is diminished. On the other hand, for the reasons stated above, the production of resilient tubular bodies by using a greater amount of interleaved, thin-walled individual pipes presents considerable difficulty. This holds true, particularly for non-rusting steel, which is a material which is otherwise well suited for the manufacture of resilient tubular bodies owing to its great strength, elasticity and resistivity to heat and corrosion.

The present invention relates to a method of making a manifoldly interleaved resilient tubular body which consists of a hollow cylinder which is formed by several windings of a metal band, the outer margin of which, at least, is secured in position. Such resilient tubular bodies may thus consist of a plurality of snugly superimposed windings, for the reason that the intermediate windings need not to be connected with each other. The resilient bodies can have any practically feasible diameter and any desired wall thickness.

In the method of producing a manifoldly interleaved resilient body, according to the present invention, a first winding layer of the metal band is wound and the inner margin thereof is welded to this winding, whereupon all the band layers are wound and then the outer margin of the metal band is welded to the layer last wound so that a hollow cylinder is produced by means of which the resilient tubular body is formed.

Advantageously, during the welding of the outer margin all the inner band layers are folded inwardly at the place of welding with the exception of the last layer.

In the accompanying drawings, in Figs. 1 to 3, the method of producing a manifoldly interleaved resilient body, according to the present invention, is illustratively exemplified, and in Fig 4 an exemplification of a manifoldly interleaved resilient tubular body, according to the present invention, is shown, in which for the purpose of illustration the thickness of the band is somewhat exaggerated.

In manufacturing a manifoldly interleaved resilient tubular body, the metal band 1 is wound into a tube 2, only the inner and the outer margin of which are secured by welding. The manufacture of such a manifoldly interleaved tube wall is effected as follows:

In the first place, one of the margins of the band is wound on a core, which may, for example consist of a wooden roll or a tube of a diameter which corresponds to the clear diameter of the tube. The position which the band margin then occupies is marked in pencil, or the like, on the first band winding, whereupon the band is removed from the core and is then preliminarily welded at 2', in an electric welding machine, between an inner roller electrode 4 and an outer roller electrode 5 at the pencil marking, by spot welding, and is then finished by seam welding (Fig. 1).

Thereupon, the band is wound on this simple tubular wall 2 until the required number of windings has been produced. The place on the outer end portion of the band which registers with the inner welded seam on the tube 2 is then marked on the outer band end portion also, whereupon the surplus band material is cut off and the outer end of the band is welded to the winding immediately underneath at 7.

In order to be able to weld also the outer seam, all the inner windings 6 are folded inwardly, as shown in Fig. 2, with the exception of the extreme outer winding, which can be easily achieved, particularly if a highly resilient material, such as non-rusting steel, is used, without kinking the band. The inwardly folded band windings can be kept from being forced back by inherent spring by means of any suitable device operating, for example, by means of screwdowns or the like. This being completed, there is enough available space for the lower electrode carrier arm 3 of the electric seam welding machine to be inserted in the tube, for the purpose of securing also the outer band margin in position by seam welding (Fig. 2).

On the completion of this operation, the inwardly folded windings are allowed to return outwardly again by snap action, thereby to obtain a manifoldly interleaved hollow cylinder, from which, in a manner known per se in the manufacture of resilient tubular bodies, a resilient tubular body, as shown in Fig. 4, is formed, that is, manufactured. The hollow cylinder, which is instrumental in configurating this resilient body, therefore, consists in a metal band which is wound in several windings and the inner and outer margins of which are secured by welding.

Instead of securing the inner and outer margins to the respective adjacent windings by seam welding, one of these two margins may be secured only by spot welding also. Further, the welding of the inner band margin in position may be dispensed with, for the reason that this margin, due to inherent spring of the material assisted by the interior pressure, said margin tends at all times to bulge outwardly and thus to lean against the outer windings.

Advantageously, the band margins are so trimmed that the butt edge of the outermost band winding registers with the butt end of the innermost band winding so that the wall thickness is not increased at all.

Obviously, a cylindrical manifoldly interleaved tube could also be built in which the inner and the outer seam are welded simultaneously throughout their length. Such a tubular shell would, however, not be fit for making a resilient tubular body therefrom. The reason for this is that, apart from the fact that a welded seam for uniting a plurality of as many sheet metal thicknesses as used for this purpose will never turn out, in welding, so as to be equally strong and uniform as a welded seam for uniting only two thicknesses of sheet metal would be, such a tube would have the great drawback that, by welding all the individual wall thicknesses together, considerable stiffening of the sheets only on one of their sides ensues, together with the impossibility for the various sheets further to perform relative sliding movements. These adverse conditions deprive the manifoldly interleaved resilient tubular bodies of the one great advantage attendant to such bodies that they are highly elastic compared with single walled resilient tubular bodies of the same wall thickness.

The resilient tubular body shown in Fig. 4 has an extraordinarily great strength, and since the mode of manufacturing it requires no lubrication of the working material, also the drawback arising from such lubrication is done away with. Moreover, this mode of manufacture is much simpler and cheaper than that requiring a great number of tubes which must interfit with each other very exactly.

The present resilient tubular body, instead of presenting a great many welding seams and greatly encumbering overlaps, has but one inner and one outer seam which do not either increase the wall thickness in the least or reduce the elasticity. Compression tests have shown that elastic tubular bodies of this kind respond to the highest requirements made on them.

Extraordinarily great demand on resilient tubular bodies for pipe line compensators of great clear diameter and high pressures, for example, for overheated steam exists. The conventional resilient tubular bodies are in want of strength to withstand pressure, and of elasticity. A resilient manifoldly interleaved tubular body manufactured after the present method and comprising, for example, ten windings of a clear diameter of 200 mm., each having a thickness of material of 0.2 mm. so as to provide a total wall thickness of 2.0 mm. withstands an operating pressure of 100 atm. overpressure without being lastingly deformed. The inherent stiffness of this resilient body is relatively very small and its elasticity is very great.

A further drawback of the conventional methods of interfitting several thin-walled tubes and electrically welding them together consists in that the electrical welding invites the setting up of inner stressing in the working material, in consequence whereof, the tube showed wavy formations along the seam thereof. In order to make possible the interfitting of tubes the cross section of which deviates from the true circular form, the inner tubes must be considerably thinner and thus must be expanded after the interfitting, so as to provide for snug bearing engagement between the individual tube walls. As a result of this treatment the working material is, however, subjected to a materially greater extent to additional stressing due to elongation. This drawback is also eliminated by virtue of the method as described with reference to Figs. 1 to 3, due to the fact that the individual windings bear perfectly smoothly and snugly against each other.

I claim:

The method of making a fluid tight multi-layered tube adapted to withstand substantial pressure from a sheet of metal, comprising winding a portion of a sheet of metal into a tubular shape with one end portion adjacent an interior portion of the sheet, welding the said end portion to the interior portion by heating said portions to welding temperature by passing electric current through said portions, winding a plurality of turns of the sheet of metal about the tube thus formed, bending the inner tube and intermediate windings inwardly away from the outermost winding, and electric resistance welding a seam between the other end of the sheet constituting the marginal portion of the outermost winding and an adjacent part of said outer winding, and bending the inwardly bent windings and inner tube outwardly to conform in general to tubular shape.

ALBERT DREYER.

REFERENCES CITED

The following references are of record in the file of this patent:

UNITED STATES PATENTS

| Number | Name | Date |
| --- | --- | --- |
| 35,124 | Yeakel | Apr. 29, 1862 |
| 979,460 | Fulton | Dec. 27, 1910 |
| 1,688,762 | Steenstrup | Oct. 23, 1928 |
| 1,816,534 | Hume | July 28, 1931 |
| 2,039,781 | Debenedetti | May 5, 1936 |
| 2,273,736 | Raymond | Feb. 17, 1942 |